(12) United States Patent
Singh et al.

(10) Patent No.: US 12,360,950 B2
(45) Date of Patent: Jul. 15, 2025

(54) SYSTEMS AND METHODS FOR GENERATING ANNUAL PRODUCT QUALITY REVIEWS

(71) Applicant: Honeywell International Inc., Charlotte, NC (US)

(72) Inventors: Ankit Singh, Apex, NC (US); Timothy Sneed, Charlotte, NC (US); Arun Ramasubrahmanyan, Burlington, NJ (US); Judith Fainor, Doylestown, PA (US); Tanmay Sonawadekar, South Grafton, MA (US); Daniel Burns, Allentown, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 318 days.

(21) Appl. No.: 17/930,952

(22) Filed: Sep. 9, 2022

(65) Prior Publication Data
US 2024/0086979 A1   Mar. 14, 2024

(51) Int. Cl.
*G06F 16/10* (2019.01)
*G06F 16/16* (2019.01)
*G06F 16/2452* (2019.01)
*G06F 16/2455* (2019.01)
*G06F 16/25* (2019.01)
*G06Q 30/0282* (2023.01)
*G06F 16/14* (2019.01)
*G06F 18/15* (2023.01)

(52) U.S. Cl.
CPC ...... *G06F 16/168* (2019.01); *G06F 16/24528* (2019.01); *G06F 16/2455* (2019.01); *G06F 16/24564* (2019.01); *G06F 16/25* (2019.01); *G06F 16/258* (2019.01); *G06Q 30/0282* (2013.01); *G06F 16/156* (2019.01); *G06F 18/15* (2023.01)

(58) Field of Classification Search
CPC ................. G06F 16/156; G06F 16/168; G06F 16/24528; G06F 16/2455; G06F 16/24564; G06F 16/25; G06F 16/258; G06F 18/15; G06Q 30/0282
See application file for complete search history.

(56) References Cited

U.S. PATENT DOCUMENTS

| | | | |
|---|---|---|---|
| 6,529,909 B1* | 3/2003 | Bowman-Amuah | G06F 16/258 |
| 2019/0147084 A1* | 5/2019 | Pal | G06F 16/25 707/769 |
| 2022/0058758 A1* | 2/2022 | Banks | G06Q 10/06375 |

* cited by examiner

*Primary Examiner* — Diedra McQuitery
(74) *Attorney, Agent, or Firm* — ALSTON & BIRD LLP

(57) ABSTRACT

A method of generating an annual product quality review report includes defining at least one author for generating the report; selecting a chapter for inclusion in the report, wherein the chapter is associated with one or more predefined data requirements which predefined data requirements may be presented to the author for inclusion in the report; defining at least one system of record from a plurality of systems of record as a source of raw data for providing data to the one or more predefined data requirements. The at least one system of record provides raw data to the predefined data requirements through a tech fabric that causes the raw data to populate one or more enterprise object models to standardize the raw data.

13 Claims, 8 Drawing Sheets

FIG. 6

SYSTEMS AND METHODS FOR GENERATING ANNUAL PRODUCT QUALITY REVIEWS

TECHNICAL FIELD

The present disclosure relates generally to systems and methods for generating an annual product quality review, and, more specifically, to systems and methods for generating an annual product quality review based on information from multiple systems of record.

BACKGROUND

Processes leading to manufacturing of pharmaceutical products may undergo an evaluation known as the Annual Product Review (APR) or Annual Product Quality Review (APQR). The APQR may help determine whether any process or products, or their underlying steps or components, require improvement, cancelation or discontinuance, or other change. Generating and analyzing APQRs can minimize product defects and other potential risks. This review can be especially important with products such as pharmaceuticals and medical devices, which products may be subjected to especially stringent legislation and careful oversight. Hence, APQRs can provide organizational value to administrators and their teams, helping to make supply chains, industrial processes, and other logistics and management more efficient.

APQRs are currently developed by a large team of managers and employees, receiving and inputting data from up to thousands of individuals into the report, which data then involves separate, individual review and approval from countless individuals before the final report is published. This data generation is often from disparate sources and in different formats, requiring careful integration. Once the data is incorporated and a draft is circulated, the incorporated data must be reviewed and approved by managers and administrators in different sectors and levels of an organization, which reviews can be iterative, each iteration requiring amendments to the data and information delivered in the report, requiring months of back-and-forth and in-between for report generators and approvers. This back-and-forth can expend a firm's resources inefficiently and result in excessive costs. Accordingly, improved systems and methods for generating annual product quality review reports may be required.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a method of generating an annual product quality review report includes defining at least one author for generating the report; selecting a chapter for inclusion in the report, wherein the chapter is associated with one or more predefined data requirements which predefined data requirements may be presented to the author for inclusion in the report; defining at least one system of record from a plurality of systems of record as a source of raw data for providing data to the one or more predefined data requirements. The at least one system of record provides raw data to the predefined data requirements through a tech fabric that causes the raw data to populate one or more enterprise object models to standardize the raw data.

In another embodiment, a method of generating an annual product quality review report includes defining at least one author for generating the report and at least one editor for editing the generated report; defining a chapter for inclusion in the report, wherein defining the chapter includes selecting at least one system of record for providing data to the chapter; selecting at least one object from a plurality of enterprise objects for inclusion in the chapter, wherein the at least one object is based on data stored in the at least one system of record; and displaying the at least one object to one or more of an author and an editor of the report in a graphical or text-based format for editing and approval of the data presented in the object.

In yet another embodiment, a system for generating an annual product quality review (APQR) report includes a processor communicatively coupled to a plurality of external systems of record; a memory including one or more instructions that when executed by the processor cause the system to: define at least one author for generating the APQR report; select a chapter for inclusion in the report, wherein the chapter is associated with one or more predefined data requirements which predefined data requirements may be presented to the author for inclusion in the report; define at least one system of record from a plurality of systems of record as a source of raw data for providing data to the one or more predefined data requirements. The at least one system of record provides raw data to the predefined data requirements through a tech fabric that causes the raw data to populate one or more enterprise object models to standardize the raw data.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 6 illustrates a third aspect of the exemplary APQR of FIG. 5.

DETAILED DESCRIPTION

Annual product quality reviews (APQR) provide valuable insight into a pharmaceutical company's technological development and business practices. Generating APQRs can involve the careful creation of multiple chapters, each chapter including various text, charts, and graphs, which objects require data from disparate data sources. Once produced, these objects and the insights they provide involve painstaking review by multiple levels of organizational stakeholders. Because the depth of data and the careful review, the process for creating an APQR can take up to a year itself.

Because of this relatively slow generation and review process, product lines reviewed in the report may have become defunct, rendering the report largely invaluable. Additionally, the large number of person hours involved in generating the report monopolizes valuable human capital for far too long, preventing other useful work from being accomplished. Further, findings and recommendations determined at the end of a report may have only limited iterative value on current processes as they were determined based on up to years old data.

Data that is processed and used for reporting in real time or near real time, rather than an annual time frame, might provide greater insight into current business practices and research and development. Hence, the more quickly data can be utilized from its generation, the riper its effective use. Moreover, the review of current data can not only provide more useful insights, it could prevent current misalignments and effect immediate improvements to production lines, human resource pools, and other sectors of a company's business. The systems and methods described herein provide for the real time or near real time processing of data and coordinated review of reports produced from such data.

Figure 1:
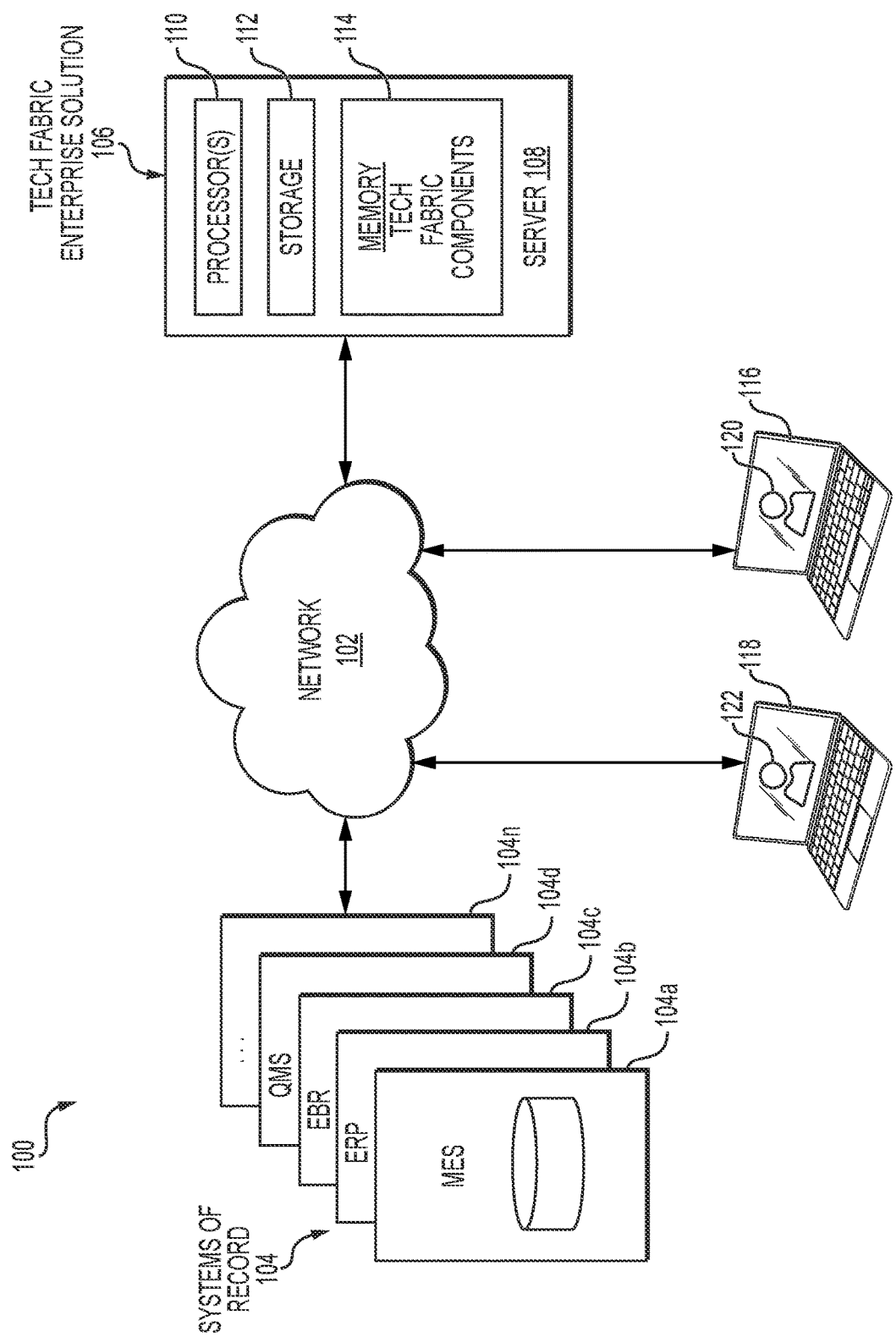
FIG. 1 illustrates a system for integrating data from various systems of record to generate a final product, according to one or more embodiments shown and described herein.

FIG. 1 illustrates an example of a computing environment 100 including a network 102 configured to communicatively connect one or more systems of record (SOR) 104 to a tech fabric enterprise solution 106 for providing data from the systems of record 104 for analysis in an annual product quality review (APQR) using the tech fabric 106. The computing environment (system) 100 or portions thereof, including the network 102, can be any type of communication network, including, for example, a wireless local area network (WLAN), a cloud network, the Internet, etc.

The SOR 104 may include, for example, a manufacturing execution systems (MES) 104a, an enterprise resource planning (ERP) system 104b, an electronic batch record (EBR) 104c, a quality management system (QMS) 104d, and one or more additional systems of record. The SOR 104 may represent available data sources that include relational data repositories and operational data stores including structured and unstructured data (e.g., collections of files, documents, sheets, etc.) In some embodiments, the SOR 104 may include and/or be configured to provide real time data. The SOR 104 may be implemented, for example, on a computer system running a database management system and may serve as an authoritative source of data for a given data element (or other piece of information) within that computer system and for other computers or computer networks communicating with that computer system (e.g., the network 102). Accordingly, if different systems or computers within the network 102 disagree about a given piece of information, the data contained within the SOR 104 may control. Disagreements could stem from, for example, semantic differences, uses of different resources in different ways at different times, differences in timing, extraction, transformation, loading, and other processes that create and/or manipulate data that the various computers and systems on the network 102 report against. In some cases, differences in data may be the result of one or more inconsistencies or bugs within the various components of the system. Hence, the SOR 104 may serve as a valid data source when there is no valid, traceable source. Because the reports generated using the data from these various SOR 104 is generally data for consumers of data who have generally similar needs (i.e., the generation and approval of a single report), the use of systems of record to provide verified, consistent data may be preferable to other types of data incorporation such as in systems that require most recent data or data which has been individually vetted.

Examples of information stored in the SOR 104 include information related to, for example, customer services, sales, procurement, production, distribution, accounting, human resources, corporate performance and government, etc.

Figure 2:
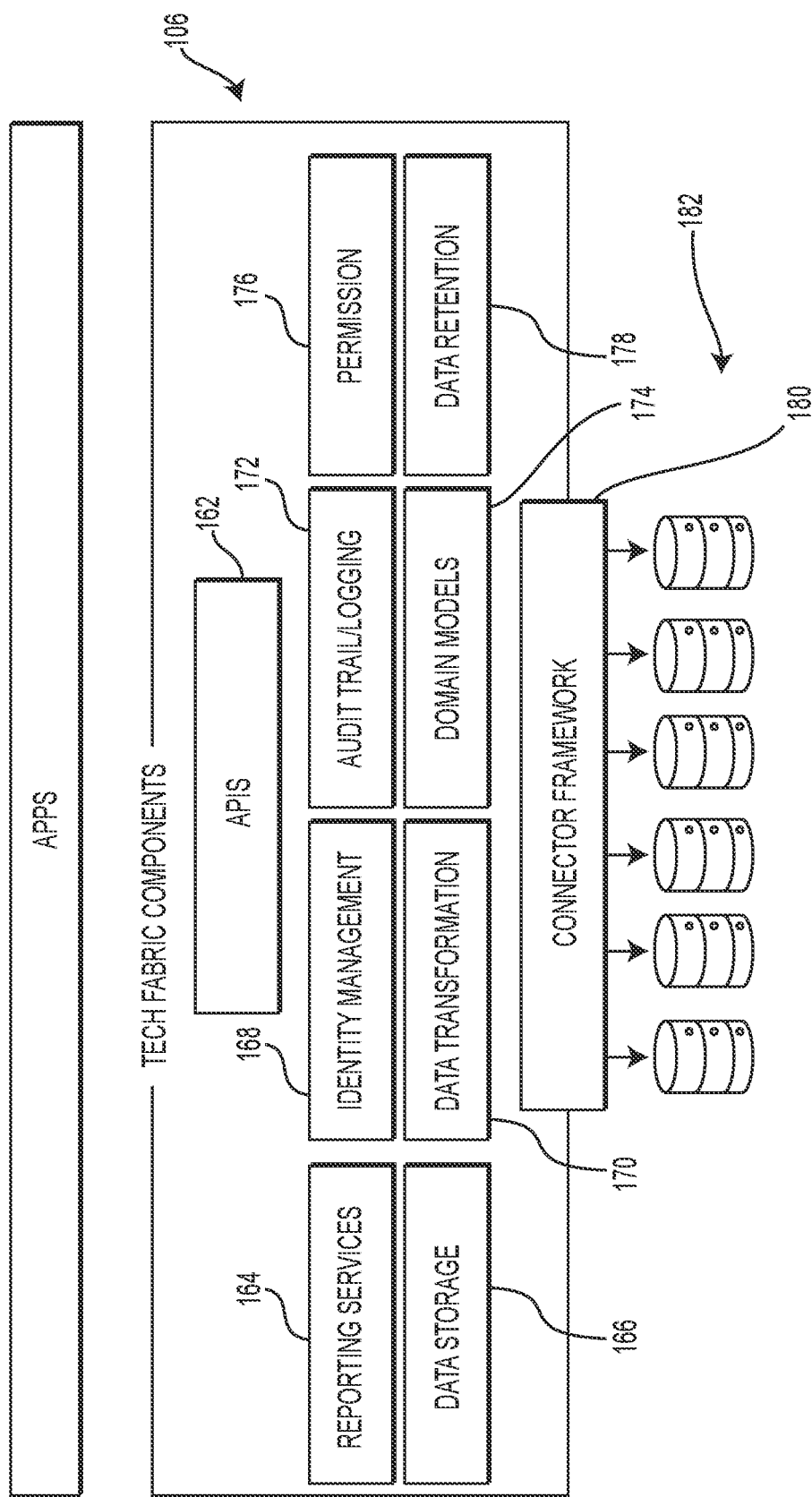
FIG. 2 illustrates a tech fabric component of the system of FIG. 1.

In some embodiments, the tech fabric enterprise solution 106 may be implemented by a computer system which may include, for example, a server 108 including one or more processors 110 and a memory 114 which may include the components of the tech fabric 106, which is shown in greater detail in FIG. 2. The applications of the tech fabric 106 may be implemented, for example, by the one or more processors 110. The computer system may include any type of computing device(s), including any type of server systems (e.g., virtualized, stand-alone, etc.) The computer system may be operated using an operating system (OS), for example, Windows, Linux, UNIX, etc. The processor 110 may be a single or multiple microprocessors. The memory 114 may be a random access memory and may comprise one or more memory modules. The storage 112 may be any type of storage device including disc storage, solid state storage device, etc.

The network 102 may be accessed using, for example, a computing device 116 and a computing device 118, which devices may be configured to grant access to the network 102 to one or more users, for example, a systems admin 120 and a business admin 122. The systems admin 120 may have access to aspects of the tech fabric administration such as the systems of record integrations and mappings from the systems of record raw data fields to various enterprise object models as described in greater detail herein. The business admin 122 may have configuration responsibilities for various aspects within one or more final reports generated using the tech fabric enterprise solution 106 and within the tech fabric enterprise solution 106 itself.

Referring now to FIG. 2, additional details are provided with respect to the tech fabric 106. The tech fabric 106 may include an API module 162, a reporting services module 164, a data storage module 166, an identity management module 168, a data transformation module 170, an audit trail/logging module 172, a domain models module 174, a permissions module 176, and a data retention module 178. The various modules may provide data to a connector framework 180 for sending the processed data to one or more databases 182.

The APIs module 162 may provide one or more users (e.g., the systems admin 120, the business admin 122, etc.) and/or developers with one or more tools (e.g., wizards, UIs, etc.) to design, test, implement, deploy, and manage APIs for use across the environment 100. A user can create one or more intermediaries (e.g., software applications) that may make it possible to read, convert, present, use, manipulate, or otherwise access the data on the SOR 104 for presentation or other use in a generated product. The APIs module 162 may be cloud-based or locally accessible by one or more users (e.g., the systems admin 120, the business admin 122, etc.)

The APIs module 162 may be used to, for example, create one or more programs for various programs or applications on computers and/or computer systems within the network 102 to communicate with one another. In some embodiments, the APIs module 162 may include an API specification, which may describe how to build and/or use one or more of the APIs built using the API module 162 or otherwise within the network 102. The APIs module 162 may include one or more subroutines, methods, requests, or endpoints, which subroutines, methods, requests, and endpoints may be tools used to program the one or more APIs. The APIs module 162 may be used to generate one or more APIs for specific reports built using the systems and methods described herein.

In some embodiments the APIs module 162 may be used to build one or more web APIs, which may allow communication between one or more computers or computer systems which may connect the network 102 with another external network (e.g., the Internet). In some embodiments, the web APIs may allow access to one or more computers or computer systems communicatively coupled to the network 102 through one or more client devices (e.g., mobile phones, laptops, etc.), which devices may connect to the network using, for example, the hypertext transfer protocol (HTTP). These client devices may send a request in the form of an HTTP request, which request may be met with a response message in a different format (e.g., JavaScript Object Notation (JSON), extensible markup language (XML), etc.) In some embodiments, one or more users may use a web API (e.g., a web API created by the APIs module 162) to query the one or more SOR 104 for a specific set of data from one or more of the SOR 104.

The APIs module 162 may include a language binding API that may provide glue code that may allow one or more programming languages to use a foreign library or operating system service (e.g., one that is not native to the particular language). The language binding API may map or bridge one programming language to another so that a library written for one language may be used in a different language. For example, one or more of the SOR 104 may have one or more functions written in C or C++ and the language binding API may bind the C or C++ language to a higher level code such as, for example, Python, Lua, Java, Common Lisp, etc. The binding may be based on recompiled code or a foreign function interface, such as, for example "ctypes."

The reporting services module 164 may aggregate usage information for various aspects (e.g., files, data, etc.) and may report the usage information to one or more of the various interconnected systems or modules (e.g., the APIs module 162, the network 102, etc.). For example, if a particular file or data is accessed and/or used, the reporting services module 164 may aggregate data regarding the use of that particular information and report it to one or more internal modules or external systems. The reporting services module 164 may further generate information regarding, for example, statistical information on the amount of usage of the tech fabric enterprise solution 106 or other components of the system 100.

The data storage module 166 may include one or more storage drives configured to retrieve stored data in response to one or more storage commands received from the system 100 (e.g., from the system admin 120). The data storage module 166 may include hardware and software components, for example, the data storage module 166 may include a plurality of storage drives (e.g., solid state drives) that may be configured to store and retrieve data in response to storage instructions. Portions of the storage module 166 may be implemented using software modules, such as drivers, services, and/or the like. Other portions of the storage module 166 may be implemented using hardware resources, such as FPGAs, processors, ASICS, hardware controllers, storage controllers, and the like.

The data storage module 166 may include and/or communicatively couple to one or more elements of physical support structure (e.g., an enclosure), which support structure may include one or more printed circuit boards, circuitry, semiconductor systems, and one or more other structural elements. The physical components may be, for example, insertable and removable from a rackmount style of enclosure. In some embodiments, the data storage module 166 and/or one or more of its components may include devices which may provide self-power during, for example, a power interruption event such that the storage components and those communicatively coupled with the storage components maintain power via a backup or auxiliary means until a primary source of power (e.g., the electric grid) can be restored.

The identity management module 168 may provide identity services such as access management and authorization services to the tech fabric 106. The identity management module 168 may control information about tenants and clients which may utilize the services provided by tech fabric 106. Information used and generated by the identity management module 168 may include authenticating information that identifies users and assigns the users appropriate authorizations for particular system resources. In some embodiments, the identity management module 168 may include a framework of policies and technologies that may safeguard the network 102 such that the correct users (e.g., that are part of the ecosystem connected to the network 102) have the appropriate access to the appropriate tech resources. The identity management module 168 may enable users to create and/or gain an identity within the ecosystem, assign the created/gained users or other users one or more roles within the ecosystem, and may assign permissions and/or identity grants to the users. The identity management module 168 may store and make available the identities and the technologies supporting that protection (e.g., network protocols, digital certificates, passwords, etc.)

The identity management module 168 may serve various functions throughout multiple stages of a user's interaction with the network 102. For example, during a registration phase and during an operation phase. During the registration (or configuration) phase, the identity management module 168 may register and authorize access rights. During the operations phase the identity management module 168 may continuously identify, authenticate, and control the individual identities and/or groups of identities with access to the various hardware and/or software systems of the network 102. The identity management module 168 may serve, for example, five basic functions: pure identity, user access (e.g., log-on), presence-based services, identity federation, and audit function. In some embodiments, particular one(s) of the various SOR 104 and/or modules of the system may be accessible by only various users of the network 102 with granted access and the identity management module 168 may identify and record which users have access to such SOR 104 and/or modules.

In some embodiments, the identity management module 168 may communicatively couple with one or more external identity management systems, which system(s) may perform one or more of the functions described herein with respect to identity management external of the network 102. One or more users (e.g., the user admin 120, the business admin 122, etc.) may assign the various credentials and other permissions associated with a user's identity. In some embodiments, a user's identity may be associated with one or more cryptologic keys or other access keys, which may serve as a two-factor or multi-factor authentication key for verifying a user's identity.

The data transformation module 170 may be configured to transform, convert, and/or translate data acquired from the SOR 104 for use by the tech fabric 106. The transformation module 170 may be configured to parse data structures acquired from the SOR 104 and to transform the constituent data into a format that is compatible for use with one or more other components of the system 100 (e.g., one or more other modules or for storage in a database). The tech fabric 106 may comprise multiple data transformation modules 170 and each may be configured to transform data from one or more of the individual SORs 104a, 104b, etc. (e.g., data transformation modules that are specific to a particularly formatted data from a particularly formatted SOR). The data transformation module 170 can receive a user query and retrieve and transform unstructured or structured data in response to receiving the user query.

The audit trail/logging module 172 may be configured to track, in real time, a request for identity verification and any response thereto from any of the various users of the system 100. In some embodiments, the audit trail/logging module 172 may be configured to track or monitor services performed by various users of the system and by the various components of the system (e.g., one or more servers). The audit trail/logging module 172 may be configured to record a detailed log of actions and events which occur within the system 100, such that the system administrator 120 or other user may identify and locate sources of error.

The domain model module 174 may store one or more data relationships in a lexicon or term list associated with a particular industry for which the final product of the process will be generated. For example, the domain model module may store one or more data relationships in a term list associated with the life sciences industry. These domain models may be used to determine key words of interest or other information with respect to a particular final product.

The permissions module 176 may be configured to determine whether a user is authorized to access certain information and/or to perform a particular action within the system 100. The permissions module 176 may query permissions data stored in the system 100, which stored data may indicate required permissions associated with various actions or settings. Users may have varying levels of permission based on different actions/information. The permissions module 176 may access identity information for particular users and may analyze identity information to determine an identity of a user. In an example, the permissions module 176 can determine permissions of a user based at least in part on the identity of the user.

The data retention module 178 may be configured to detect a data retention triggering event and to initiate one or more data retention operations in response to detecting the data retention triggering event. For example, data may be retained in the memory 114 using one or more sets of write parameter values. In some embodiments, the data retention module 178 may be configured to delete all stored data in response to a triggering event. For example, all of a client's stored data may be deleted upon completion and delivery of an APQR. The data retention module 178 may be configured to initiate an autonomous storage operation or to create sufficient storage space for a particular operation. For example, the data retention module 178 may cause one or more data from the SOR 104 to be stored in a local module within the tech fabric 106 or other component of the system for later processing and manipulation (e.g., during report generation).

The connector framework 180 may be, for example, an object oriented framework which may facilitate communication between one or more application components (e.g., APIs) running in the tech fabric 106 and the one or more SOR 104. The connector framework 180 may include one or more protocol definitions for implementation by one or more connector components, which connector components may enable communication between the tech fabric 106 and the SOR 104, while simultaneously constraining same.

Figure 3:
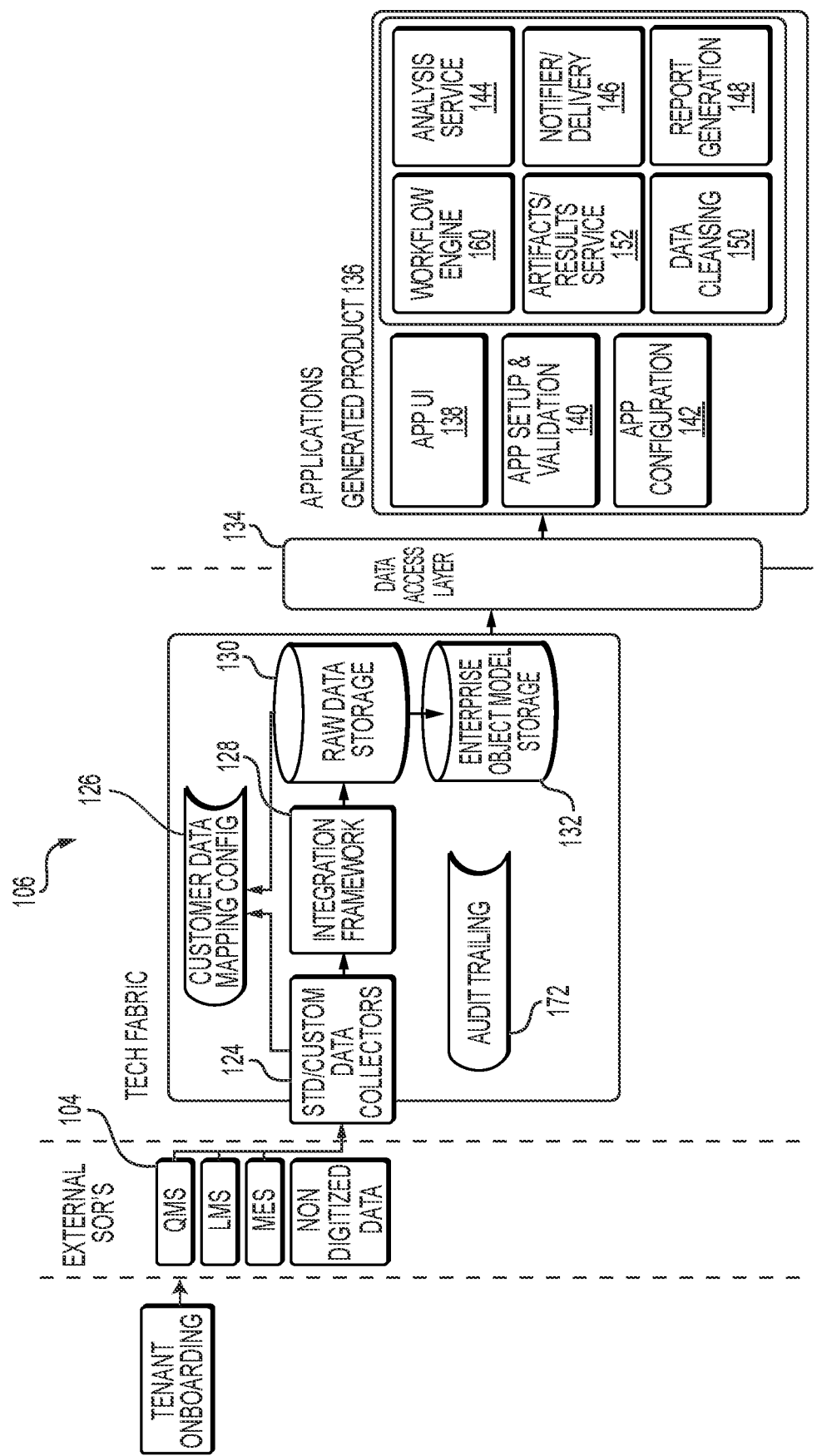
FIG. 3 illustrates an infrastructure for generating a final product using the tech fabric component of FIG. 2.

Referring now to FIG. 3, a chart for generating a final product using data integrated from numerous systems of record (SOR). Initially, a tenant may be onboarded for integration of the tenant's (i.e., client's) systems of record with the tech fabric 106. The tenant may be onboarded and may be given access to various tools within the system 100 which may exist in different environments (e.g., a customer relationship management (CRM) tool or a service oriented architecture (SOA)). In some embodiments, a tenant onboarding API may be configured to interface and allow an administrator to provide a particular tenant configuration, which configuration may be, for example, associated with a unique user identification (UUID) or a particular environment or environmental configuration. The particular tenant's SOR may be mapped to the tech fabric as will be described in greater detail herein.

As briefly mentioned above, each tenant may have different systems of record, which systems may contain disparate and dissimilar data, which must be integrated using the tech fabric 106 to generate the final product. The tech fabric 106 may be implemented using one or more connected systems or networks and its various components may be stored and implemented using connected systems or networks (e.g., in a data lake). The tech fabric 106 may include, for example, a standard/custom data collection module 124, a customer data mapping config module 126, an integration framework module 128, a raw data storage module 130, and an enterprise object model storage module 132. The tech fabric 106 may provide the enterprise object models to the data access layer 134 where they may be interactively accessed by the particular final generated product 136. The final generated product 136 may include an application user interface 138, an application setup and validation module 140, an application configuration module 142, a workflow engine 160, an artifacts/results service module 152, a data cleansing module 150, an analysis service module 144, a notifier/delivery module 146, and a report generation module 148. In some embodiments, the report may be, for example, an annual product quality review.

The data collection module 124 may include one or more subroutines or components (hardware and software) configured to query communicatively coupled SOR and acquire and collect accumulated data from the SOR 104 or subsets of SOR. The pattern and frequency of data collection may be defined, for example, by a user (e.g., system admin 120, business admin 122, etc.) In some embodiments, the pattern or time frame of data collection is based on a time frame for a given report. For example, a report that is produced using the described system 100 that covers an annual time frame may include data that is collected over a preceding year. In some embodiments, data may be collected over a quarter, or semi-annually, monthly, weekly, daily, or over any time frame. In some embodiments, data may be collected in real time from the SOR.

The customer data mapping config module 126 may include one or more sets of actions or rules (e.g., a template file) for mapping customer data from the various SOR 104 to the enterprise object models generated using the tech fabric 106. The customer data mapping config module 126 may include instructions or programs for extracting data fields from one or multiple source files and matching them to their related target fields in their destination files (e.g., the enterprise object models). The customer data mapping config module 126 may include rules for consolidating data by extracting, transforming, and loading it to a destination system (e.g., the EOM module) and may include one or more dictionaries or other lexicons (e.g., a common lexicon) for mapping the generally non-standardized data from the various SOR to a common format or definition for storage and later use in the enterprise object models as described in greater detail herein.

The integration framework module 128 may interpret input data from the SOR and output data, which data may exist in complex format and may provide the data for storage in a usable (i.e., consumable) or final format (e.g., without technical symbols, operators, text, etc.). The integration framework module 128 may set up an integration between the data collected from the SOR 104 and the raw data storage module 130 for temporary storage within the tech fabric 106, for example, the integration framework module 128 may dynamically process data from a format sent from the SOR for consumption by an API associated with the final generated product or one or more iterative steps before the final generated product. The integration framework module 128 may provide a core set of data pipeline rules or minimum standards for consumption and transformation in the tech fabric 106 (e.g., one or more rules, policies, modules, databases, and/or applications). That is, the integration framework module 128 may transform, cleanse, prepare and/or otherwise manipulate the data into a more usable or useful form. The integration framework module 128 may store information regardless of storage platform (i.e., platform agnostic) and may be located in one or more virtual servers running in a cloud-based environment running one or more virtual machines, for example, which may execute the integration framework module 128.

The raw data storage module 130 may receive and store data received from the various SOR and converted using the customer data mapping config module 126. The raw data may be data that is useable and understandable by the various enterprise object models and stored in a standardized and acceptable format. The raw data formats usable by the enterprise object models may be assigned and controlled by one or more users of the system (e.g., the system admin 120, the business admin 122, etc.) The raw data storage module 130 may be updated routinely with data from the various SOR based on a schedule defined by one or more users of the system (e.g., the system admin 120, the business admin 122, etc.) In some embodiments, the raw data storage module 130 is cleared based on expiry of a particular tenant's (e.g., client's) access to the tech fabric 106 and associated systems, for example, data that is collected and transformed using the system 100 then stored in the raw data storage module 130 or other component of the tech fabric 106 may be deleted at a given time frame after a project completion. For example, the stored data may be automatically deleted within a week of providing a completed project to a client or other user.

The raw data storage module 130 may store the raw data from the various SOR 104 to be populated into the enterprise object models which will be used to generate portions of a report as described herein. The raw data storage module 130 may store the raw data with one or more vendor specific characteristics and there may be no or fewer rules associated with raw data storage than with the storage of the data in the enterprise object model storage module 132.

In some embodiments, the raw data storage module 130 may be configured to perform additional data storage operations such as, for example, creating, storing, retrieving, and migrating storage data (e.g., storage data from the SOR 104) (which may include, for example, snapshot copies, backup copies, Hierarchical Storage Management (HSM) copies, archive copies, and other types of copies of electronic data) stored on storage devices. In some embodiments, storage operations may include storage operations copies of data, including informational lifecycle management (ILM), deduplication, content indexing, data classification, data mining or searching, collaborative searching, encryption and compression.

The enterprise object model storage module 132 may store one or more enterprise object models which are configured to query or access the data in the raw data storage module 130. The enterprise object models may be grouped into packages and may provide the raw data to a user in a useful, extensive, and well documented set of properties and methods that may be intuitive to a user for the generation of a final product. The enterprise object models may provide for the generation of and/or access to one or more diagrams, features, elements, metadata or other representations based on the raw data (e.g., charts, graphs, etc.) The enterprise object models may provide standardized access to the raw data from the various SOR to the various applications and modules of the system 100. The enterprise object models module 132 may thus provide a user with a set of standardized tools for generating custom reports and/or performing ad hoc queries to the databases an modules associated with the system 100.

For example, the enterprise object models may create one or more objectified view(s) of work processes, work products, behaviors, outcomes, and other data ("viewable workflow instance") (e.g., a success rate of a particular medicament at treating an ailment) and may provide access to such data via an access component that may provide access to the viewable workflow instance such that customizable features of the instance can be defined (e.g., for user manipulation during run time). In some embodiments, customizable features may include, for example, charts, graphs, texts, and the like, which may be presented to a user via, for example, the data access layer 134. In some embodiments, the viewable workflow instance may be accessed directly (e.g., via the data access layer 134) such that the instance can be interacted with as a visible object type or class. In some embodiments, the enterprise object model storage module 132 may be customizable by a user such that a base definition can be used to generate one or more novel workflow definitions with one or more customizable properties, events, methods, etc.

Still referring to FIG. 3, the data access layer 134 may include a mapping module (not shown), which mapping module may be configured to execute a mapping technique (e.g., a generic mapping technique) to one or more object requests, which may be provided through the tech fabric 106 or the generated product 136. The data access layer 134 may specify how the requested objects map to a database, such as the faw data storage module 130, for example. The mapping or config files may be stored in, for example, XML files, and the data access layer 134 may process these XML files to build a representation of the data stored in XML files. In some embodiments, if the data access layer 134 receives one or more requests to retrieve objects (e.g., an object request), the data access layer 134 may process its in-memory representation of the mapping to generate one or more SQL queries for the database. The data access layer 134 may then execute the one or more queries and packages the results. The data access layer 134 may be configured to handle up to all retrieval requests.

The data access layer 134 may provide access to a front end consumer of data (e.g., a front end server). The data access layer 134 may be implemented, for example, on the network 102 such that it is implement on the same server as the tech fabric 106 and/or may be implemented on another server, which other server may be communicatively coupled with the network 102. The various programs and APIs of the report generation tool 136 may access the tech fabric 106 via the data access layer 134 such that the data access layer 134 configures the interaction between the data storage resources (e.g., the various SOR 104) and may minimize or obscure (in the eyes of a user of the system) the complexities of the underlying resources from the other layers of the system and/or network 102. The data access layer 134 may be, for example, a web server. The data access layer 134 may include multiple layers (not shown) including, for example, a business logic layer, a data layer, and a presentation layer. As mentioned above, the data access layer 134 may include mapping module which may include one or more applications or program which may serve as a data locator or data locator service that may facilitate location of one or more active partitions of a database. For example, the data access layer 134 may request a location of active (or "live") data or inactive data from a data locator service before generating requests to avoid the attempted or achieved retrieval of erroneous data.

The generated product 136 may be, for example, a custom report, which may be viewable using the application user interface 138. The application user interface 138 may be configured to direct a computing device executing a software application to provide a user interface through which a user of the computing device may interact with the software application (e.g., by navigating application menus, associated menu options, etc.) Application user interface 138 may be configured, for example, to generate a GUI and direct a computing device executing a software application to provide one or more views of the GUI for display on a display screen. The GUI may be configured, for example, with a GUI window framework.

The application setup and validation module 140 may be executed to validate and verify that an associated application meets design and development requirements. The application configuration module 142 may select content to be included in one or more applications from the enterprise object model storage module 132 and may generate, for example, one or more configuration templates for various applications (e.g., the final generated product) and may transmit one or more configuration templates to one or more other modules of the system 100 for further use. The application configuration may be based on an application configuration request, which may be received based on a user input (e.g., a system admin 120 input, a business admin 122 input, etc.) The workflow engine 160 may be configured to allocate one or more tasks, to generate one or more schedules, or to assign one or more tasks to various users of the system 100 (e.g., the system admin 120, the business admin 122, etc.) The workflow engine 160 may dynamically adjust one or more steps in a sequence of workflow based on, for example, a result of one or more preceding steps in a workflow (e.g., generation of a report). The one or more preceding steps may be received automatically from devices associated with one or more users of the system 100 or other network components. The workflow engine 160 may iteratively fine-tune one or more steps in the generation of a final product until an acceptable final product has been created. Artifacts/results service module 152 may include one or more software and/or hardware components including executable instructions that may cause or enable report artifacts and/or results (e.g., test results, laboratory results, etc.) to be removed from and/or presented in a final product (e.g., a report).

The data cleansing module 150 may include software and/or hardware components including executable instructions that may change and/or remove suspect data from the final report. In some embodiments, the data cleansing module 150 may be configured to remove all data once a final report or final product has been generated, approved, and provided to an external system. The data cleansing module 150 may map, sort, and label data as data which should be cleansed or retained after the generation and subsequent delivery of a final product such that data necessary to the generation of further final products is maintained. The data cleansing module 150 may be configured to cleanse data on a schedule or on demand (e.g., at the demand of a system admin 120, a business admin 122, etc.)

The analysis service module 144 may be configured to perform anomaly detection and decision support, which may be used to generate one or more reports regarding the effectiveness of the tech fabric 106 and associated systems and modules. The analysis service module 144 may provide data to one or more external or internal modules for monitoring and/or evaluation of the analysis provided in the final report. The notifier/delivery module 146 may provide notifications of various events during system operation and may deliver such notification to one or more users or other modules or aspects of the system 100. For example, the notifier/delivery module 146 may be configured to provide a business admin 122 a notification that a final product has been generated, that one or more of the configuration settings of the system has been changed, etc. The report generation module 148 may generate one or more final products (e.g., reports, charts, analyses, etc.) based on stored data from the SOR, instructions from the one or more users, templates stored in the system 100 and other aspects. The report generation module 148 may receive processed data from one or more of the other modules of the system 100 and may generate a report to be displayed to one or more users of the system 100. The report may contain, for example, charts, graphs, text, and other data generated based on the data obtained from the various SOR.

Figure 4:
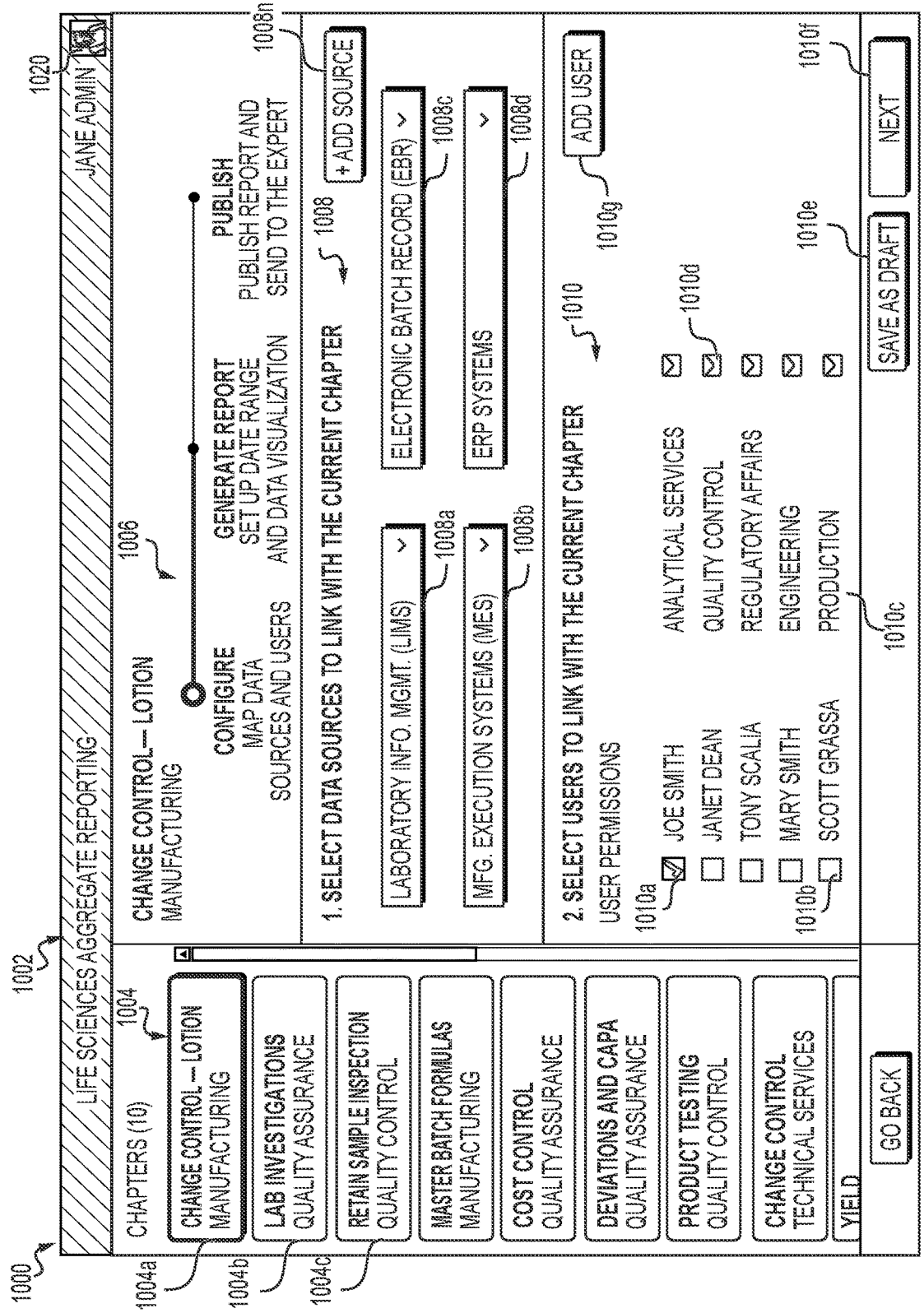
FIG. 4 illustrates an exemplary annual product quality review (APQR) report, which may be generated using the system of FIG. 1.

Referring now to FIG. 4, an exemplary interface for developing an Annual Product Quality Review (APQR) report is illustrated in detail. The interface includes a dashboard 1000 which may include a heading 1002 and various interactive sections including a chapters selector 1004, a status selector 1006, a data sources selector 1008, and a user selector 1010. The APQR may be editable by an admin 1020, which may be, for example, a business admin 122.

The chapters selector 1004 may provide a user (e.g., a report author, a report editor, etc.) the capability to select various chapters for inclusion in the final report. The chapters selector 1004 may offer chapters such as a "change control—lotion" chapter 1004*a*, a "lab investigations" chapter 1004*b*, a "retain sample inspection" chapter 1004*c*, etc. The chapters may define main divisions of the information included in a report such as the APQR. Because every report may not require the same information, the chapter selector 1004 offers the authors and editors the option for selecting which type of information may be included in the report. The individual chapters eventually included in the report may be populated with information based on the enterprise object models discussed herein. That is, selection of a particular chapter may cause particular information to be displayed in the report via one or more modules of the generated product 136, for example, the report generation module 148.

Each of the chapters 1004, when selected, may include default information for inclusion in the report. For example, a "cost control" chapter may include such default information such as product costs, labor costs, etc. These data may come from different SOR 104 which SOR 104 may be communicatively coupled to the network 102 as described otherwise herein.

In some embodiments, not all participants to report generation may have access to all chapters 1004. For example, a contributor to one chapter (e.g., a "product testing" chapter) may not have access to all other chapters (e.g., may not have access to a "master batch formulas" chapter). Accordingly, information in the individual chapters may be screened and such screening may be accomplished by one or more modules of the system 100 (e.g., the identity management module 168, the permissions module 176, etc.)

The status selector 1006 may inform a user (e.g., author/editor) where in the reporting process the current report is and may give the user the opportunity to switch between various phases in the report generation process. For example, the report may be at a "configure" stage, during which the parameters of the eventual report may be determined. For instance, the chapters to be included in the report may be selected, the various data sources from which to gather data may be selected, and/or the users who will have access to the report may be selected. In some embodiments, the user may select to "generate report" and "publish" from the status selector once the parameters of the report have been determined. The parameters of the report may be editable by those users with permission, including the authors and editors of the report. T The data sources selector 1008 may provide a user with the capability to select from which SOR 104 the data upon which the report will be based is procured. FIG. 4 shows a laboratory information management system (LIMS) 1008*a*, a manufacturing execution system (MES) 1008*b*, an electronic batch record (EBR) system 1008*c*, and an ERP system 1008*d*, but this is not an exhaustive list and other systems and databases are possible. The various SOR 104 may provide data in variously formatted, disparate presentations, thus requiring mapping to a plurality of uniform enterprise object models as described otherwise herein. The various data sources may be selected on a per chapter basis, such that each chapter can select different data sources based on the needs of the data to be presented in that particular chapter.

As a user selects the various data sources to link with the current chapter, the tech fabric 106 or other component of the system may make the individual SOR 104 available for incorporation of data from the individual SOR 104 to the report. The data access layer 134 may cause data from the raw data storage 130 and/or the enterprise object model storage 132 to be made available for access via the mapping config layer (not shown) and/or other layers within the data access layer 134.

The user selector 1010 may provide an author and/or editor the capability to select one or more users for writing/editing the APQR. A user may be selected 1010*a* or unselected 1010*b* using the toggle. The potential user's title 1010*c* may be provided to give authors/editors an indication as to whether or not a particular potential user ought be included in report generation/approval process. Further, the user's contact information may be accessible through a link 1010*d*, providing the user the capability to confirm whether or not a potential user needs access to the APQR or for other reasons. An admin (e.g., a business admin 122) may be able to add users to edit the APQR using an "add user" toggle 1010*g*. In some embodiments, a user may be able to save his or her work and return to the same location at a later time using the "save as draft" toggle 1009.

Figure 5:
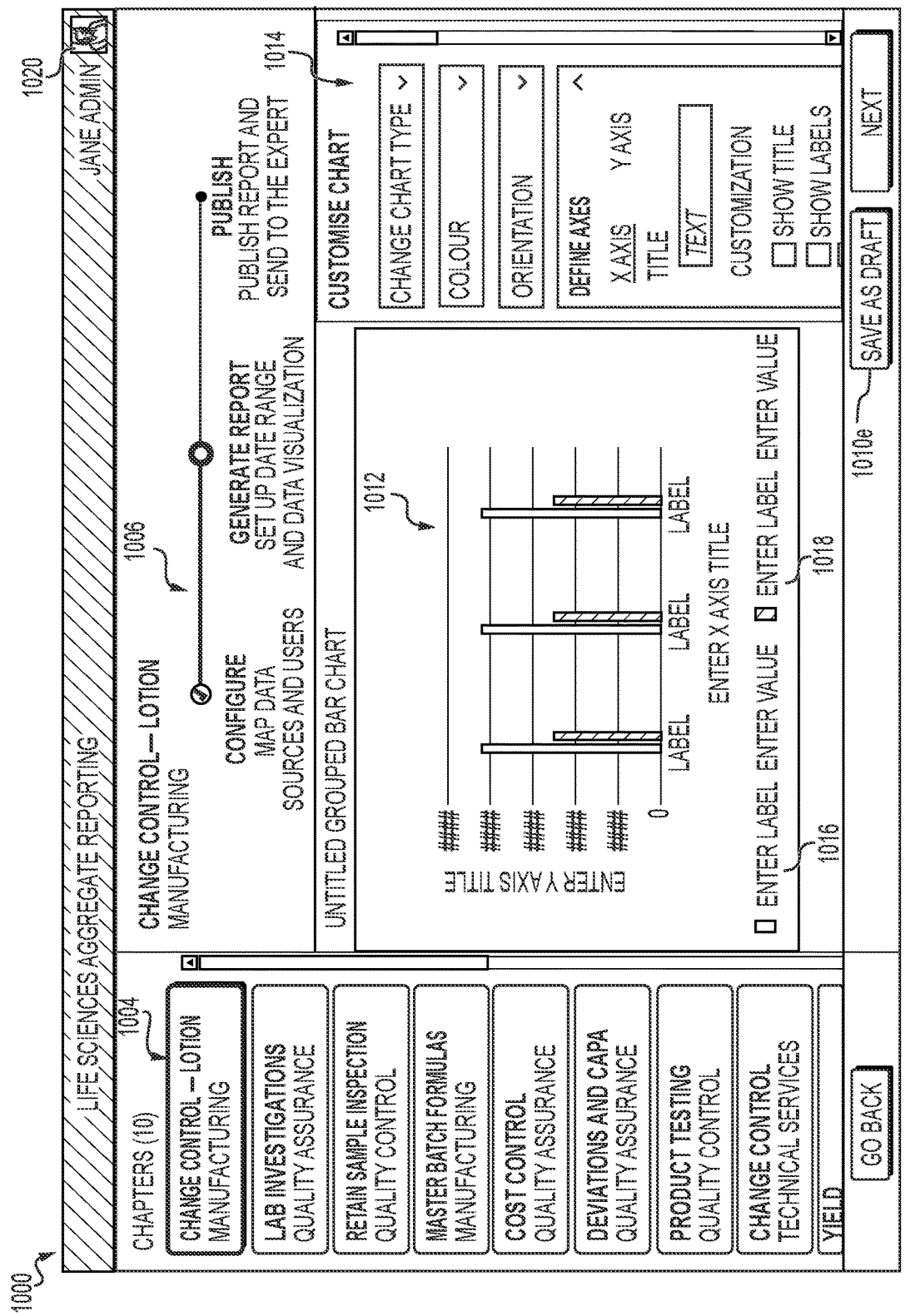
FIG. 5 illustrates a second aspect of the exemplary APQR of FIG. 4.

Referring now to FIG. 5, a portion of the APQR 1000 is shown. The portion of the APQR shown in FIG. 5 may be a portion of a generated report as indicated by the "generate report" selection of the status selector 1006. The generated report can include many types of information, including, for example, a chart 1012. The chart 1012 may receive its input data from the various SOR 104 as selected at the "configuration" step of the report. For example, the chart 1012 could receive data from one or more of the LIMS, MES, EBR system, ERP system, etc. The authors/editors of the APQR may customize the chart 1012 using a customize chart tool 1014. The customize chart tool 1014 may give a user the capability to change aspects of the chart such as, for example, a chart type (e.g., bar, pie, line, etc.), the colors of various aspects of the chart, the orientation of the chart, axis definitions, a chart title, and other aspects of the chart. The authors/editors may also have the capability to change aspects of the chart in the chart itself, such as the labels of various bars in the bar graph (e.g., label 1016 and label 1018).

Figure 6:
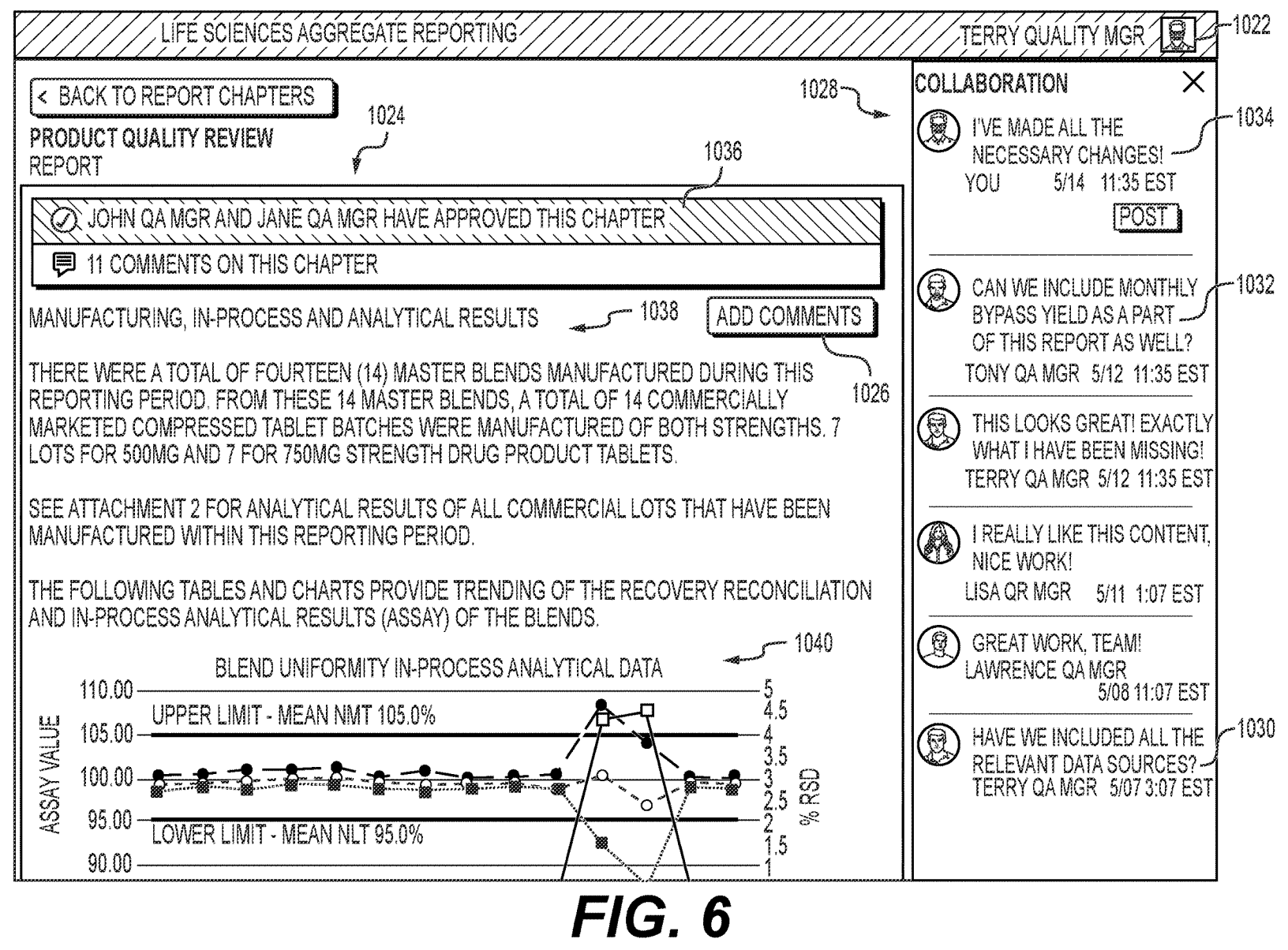

Referring now to FIG. 6, a portion of the APQR 1000 is shown under review from multiple stakeholders. The APQR 1000 may be reviewed or controlled at this stage by a separate admin than at previous stages, for example, a quality manager admin 1022 may manage access, permissions, content, and other aspects of the APQR 1000. The APQR tool may generate a report 1024, which may be text and/or graphic based. The report text and graphics are based on the data from the various SOR 104 as discussed in greater detail herein. Users with access to the report may be capable of providing comments on the report and the users' comments may be visible simultaneously with the report 1024. For example, a user may pose a question 1030 to other users of the report 1024, may make recommendations 1032 to other users, and may verify that all comments have been addressed 1034. In some embodiments, the users can add comments using an "add comments" selector 1026. The report text 1038 may include one or more editable sections. The report text 1038 may be directly editable within the report 1024 itself or may be editable by changing one or more aspects of the source data on which the report is based. The report 1024 may include a chart 1040, which chart 1040 may be editable by changing the source data upon which the report is based and/or by directly editing the chart in the APQR.

Figure 7:
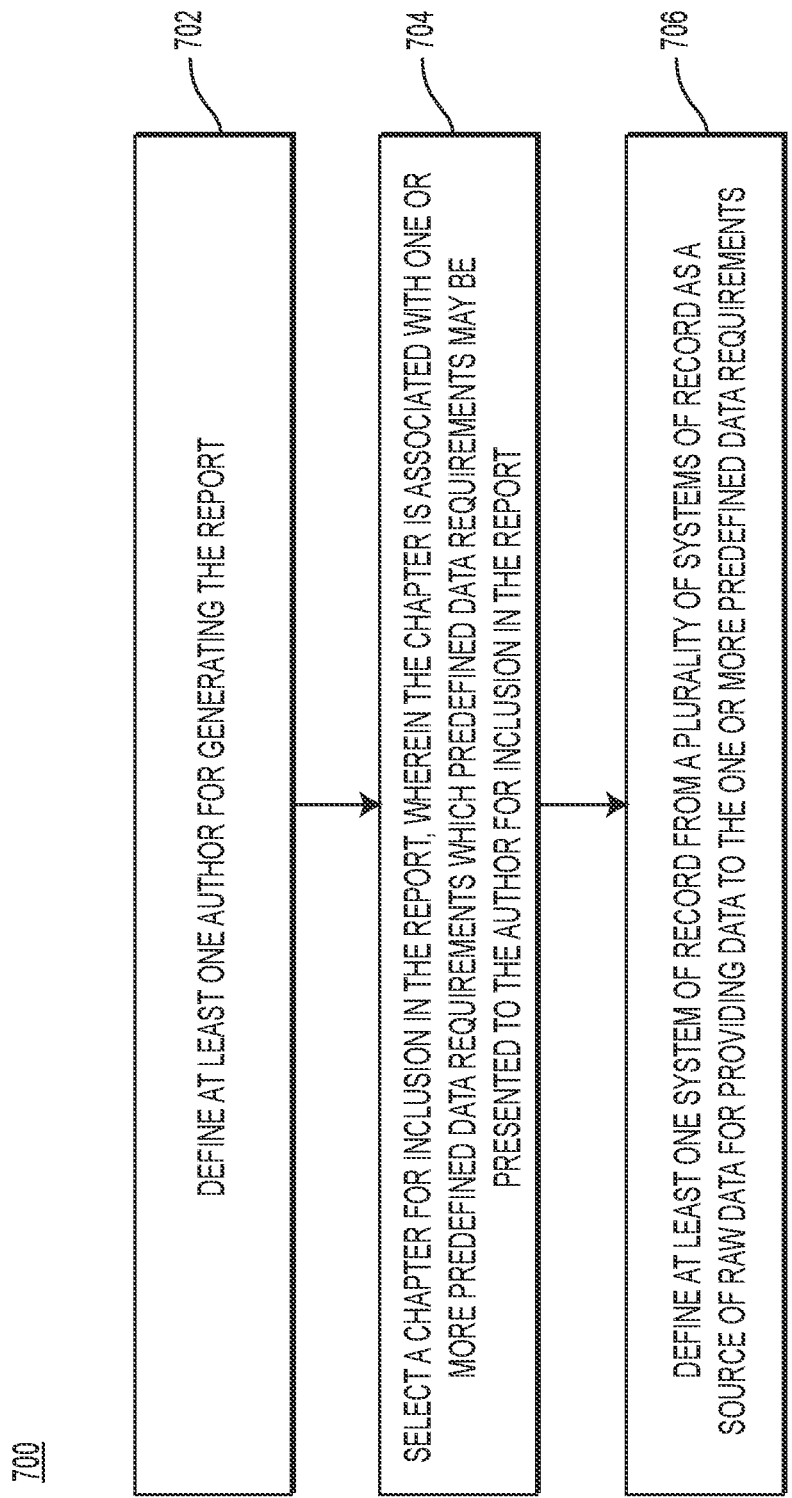
FIG. 7 illustrates a flow chart for implementing embodiments of the system of FIG. 1.

Referring now to FIG. 7, a method 700 of automatically generating an annual product quality review report is shown. The method 700 is only one embodiment and it is to be understood that other methods including different steps may be used to generate an APQR without departing from the teachings of this specification.

At step 702, at least one author for generating the report may be defined. In some embodiments, a business admin 122 may be responsible for selecting the various users who may be required to provide input to the report. In some embodiments, one or more of the selected authors themselves may be given admin privileges such that the author can select additional authors or commenters. In some embodiments, authors may be given read/write/comment privileges and other users may be given only read/comment privileges. In some embodiments, the at least one author may be checked to have the correct permissions in order to participate in the generation of the APQR and such permissions may be checked, for example, using the identity services module 168 and/or the permissions module 176. In some embodiments, the at least one author may be informed (e.g., via automated message) that he or she should contribute to the report and such report may only be finalized (e.g., validated) upon inclusion of at least one action by the defined author(s).

At step 704, at least one chapter may be selected for inclusion in the APQR. The chapter may be associated with one or more predefined data requirements and these predefined data requirements may be presented to the author for inclusion in the report. For example, a chapter relating to "master batch formulas" may require at least one chemical formula to be included in the report. A prefilled selection of chemical formulas (e.g., a library of chemical formulas) may be presented to a user for inclusion and/or the user may be presented with an option for inserting a custom formula. In some embodiments, the chapter may be associated with one or more predefined data requirements and these data requirements may be presented to the author for inclusion in the report. For example, in some embodiments, based on the type of APQR (e.g., associated with a particular product, associated with a particular production line, etc.) various chapters may be required for the APQR. The user may thus be required to select and include such chapters in the final report.

At step 706, at least one system of record from a plurality of systems of record may be defined as a source of raw data for providing data to the one or more predefined data requirements of the report. The selected system(s) of record may provide raw data to the predefined data requirements through the tech fabric 106. The tech fabric 106 may cause the raw data from the system(s) of record to populate one or more enterprise object models to standardize presentation and interaction with the raw data to the report's authors and its viewers.

In some embodiments, one or more enterprise object models may be defined (e.g., using the enterprise object models storage module 132) which may automatically assign one or more of the systems of record 104 for inclusion in the chapter based on standardized work practices or previous reports. For example, a "cost control" chapter may be automatically assigned data from an electronic batch record system of record and that data source may be automatically selected within the user interface shown in FIG. 4 for the cost control chapter. In some embodiments, a user may be have the option to deselect one or more data sources for providing data to a chapter.

In some embodiments, the various systems of record for provision of data to a chapter may be automatically assigned to that chapter (e.g., by a business admin 122, based on the SORs 104 providing data to a particular chapter in a previous report, etc.) In such embodiments, a user (e.g., author, editor, etc.) may verify and/or deselect the automatically selected systems of record 104. Further, the SOR 104 may be queried for connection to the tech fabric 106 before the inclusion of data in the APQR. In some embodiments, the meta data of the data included in the SOR 104 may be verified before inclusion in the APQR. For example, a data generation date may be verified before report inclusion such that data which is outside the bounds of a time frame for the report is not used in the report (e.g., data that is too old or too recent). Other metadata may be verified before inclusion in the report. For example, data which may have particular access privileges may be verified to only have been accessed by particular users (e.g., users with the appropriate privileges) such that data which could potentially have been manipulated or otherwise altered is not included in the final report.

Figure 8:
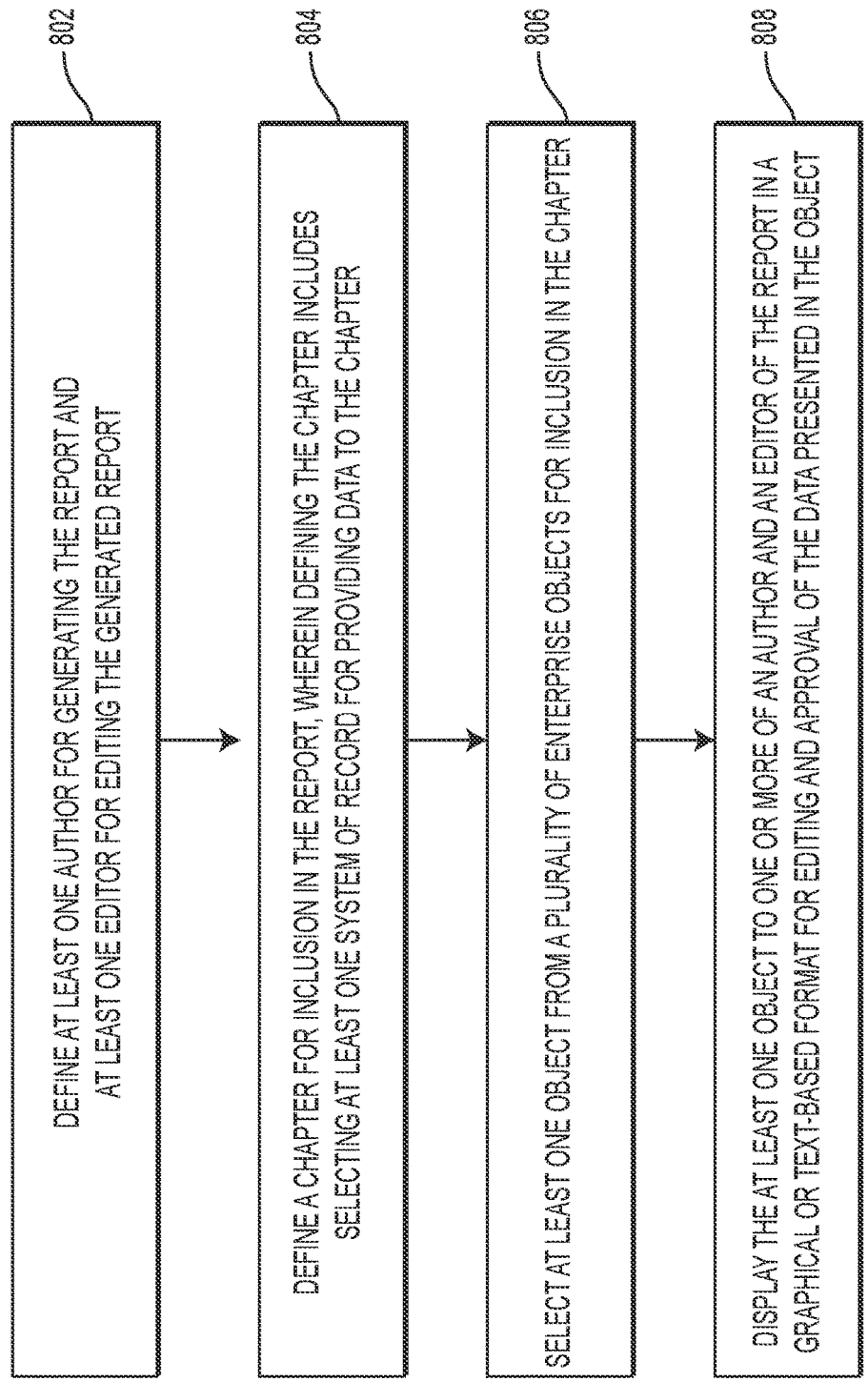
FIG. 8 illustrates a second flow chart for alternative implementations of embodiments of the system of FIG. 1.

Referring now to FIG. 8, a method 800 for automatically generating an annual product quality review report is described in greater detail. At step 802, at least one author for generating the report and at least one editor for editing the report may be selected. By selecting an author and an editor for the report, it can be ensured that the report is reviewed before publishing. There may be multiple authors and multiple editors for each report. In some embodiments, the same user may be selected as author and editor. In some embodiments, the users selected as authors and/or editors may have particular permissions and such permissions may be required before authoring and/or editing the report.

At step 804, one or more chapters for inclusion in the report may be defined. In defining the chapter, the user (i.e., author, editor, etc.) may select at least one system of record in order to populate data to the report. The user may select multiple systems of record to populate data. In some embodiments, the at least one editor and at least one author may be verified to have the correct permissions to access (e.g., author and/or edit) the report and such permissions may be verified, for example, with the identity management module 168 and/or the permissions module 176. In some embodiments, the defined authors and/or editors may be required to provide an authentication key (e.g., via two-factor or multi-factor authentication) in order to access (e.g., author and/or edit) the particular aspect of the report.

At step 806, the user may select at least one object from a plurality of enterprise objects for inclusion in the selected chapter(s). The object may be included in the report based on data stored in the selected least one system of record. In some embodiments, chapters may include one or more predefined enterprise objects (e.g., charts, graphs, text-based objects, etc.) that relate to the subject matter of the chapter. For example, a chapter labeled "cost control" may automatically include one or more charts showing costs for a given project (e.g., product line, etc.) over a specified time period. In some embodiments, the specified time period may be, for example, one year, two years, five years, ten years, etc. A chart showing costs for the previous one year, two years, five years, ten years, etc. may autopopulate into the chapter. The data included in the chart may be pulled from the various SOR 104. For example, the data associated with costs over time may be pulled from an enterprise resource planning (ERP) database 104b. By autopopulating, the data may simply only need to be verified by the authors/editors of the report. In some embodiments, enterprise object models may not autopopulate or may autopopulate only some of the various chapters or portions of chapters.

In embodiments in which enterprise object models do not autopopulate or autopopulate only a portion of one or more chapters, other enterprise object models may be selected by a user and may be included in a chapter. For example, a user may select one or more charts, graphs, texts, or other enterprise objects for inclusion in the report. The user may select which SOR 104 autopopulate the enterprise object model with data and the enterprise object model may autopopulate with data from the selected SOR 104 in the report.

At step 808, rather than pulling data from various databases manually, the object including the autopopulating data may be displayed to the editors/authors of the report in a graphical or text-based format for editing and approval of the data presented in the object. In some embodiments, the authors/editors may edit the data once it has autopopulated from the external database. For example, if the data appears to be incorrect or in an improper format, the authors/editors may update the data within the dashboard 1000. The editors/authors may also cause the system to repopulate with appropriate data if the data filling the report is inaccurate. For example, an editor/author may message a user admin via the messaging boards in the interface and inform the user admin that the data is incorrect. In some embodiments, the user admin may have privileges to update and/or change the SOR 104 that provide data to the report, to make one or more changes to the tech fabric 106, and/or to make one or more other changes to the system 100 to ensure that the correct data is provided for inclusion in the report.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method of generating an annual product quality review (APQR) report comprising:
   defining at least one author for generating the APQR report;
   selecting a chapter for inclusion in the APQR report, wherein the chapter is associated with one or more predefined data requirements;
   presenting the one or more predefined data requirements to the at least one author for inclusion in the APQR report; and
   defining at least one system of record from a plurality of systems of record as a source of raw data for providing data to the one or more predefined data requirements,
   wherein the at least one system of record provides raw data to the one or more predefined data requirements through a tech fabric that causes the raw data to populate one or more enterprise object models to standardize the raw data.

2. The method of claim 1, wherein the at least one system of record is selected from a plurality of external systems of record including one or more of a manufacturing execution system, an enterprise resource planning system, an electronic batch record system, a laboratory information management system, and a quality management system.

3. The method of claim 1, wherein the at least one system of record is selectable based on the selected chapter such that each of multiple chapters in the annual product quality review report do not require inclusion of data from same systems of record.

4. The method of claim 1, wherein the annual product quality review report includes at least one chart and the at least one chart is generated based on the data from the at least one system of record.

5. The method of claim 1, wherein the at least one author is determined by a business administrator, which business administrator approves the at least one author based on user credentials of the at least one author.

6. The method of claim 5, wherein the annual product quality review report is editable by at least one editor and the at least one editor is determined by the business administrator, which business administrator approves the at least one editor based on user credentials of the at least one editor.

7. The method of claim 1, wherein the annual product quality review report is text-based and at least some portion of the text is automatically generated based on the data from the at least one system of record.

8. The method of claim 7, wherein at least some portion of the text is automatically generated using a natural language generation application.

9. The method of claim 1, wherein selecting the chapter automatically causes one or more default systems of record to be selected for providing the raw data to the APQR report.

10. The method of claim 9, wherein the one or more default systems of record associated with a particular chapter are based on the plurality of systems of record used to populate data to the particular chapter in an immediately previous APQR report.

11. A system for generating an annual product quality review (APQR) report comprising:
    a processor communicatively coupled to a plurality of external systems of record;
    a memory including one or more instructions that when executed by the processor cause the system to:
       define at least one author for generating the APQR report;
       select a chapter for inclusion in the APQR report, wherein the chapter is associated with one or more predefined data requirements;
       present the one or more predefined data requirements to the at least one author for inclusion in the APQR report; and
       define at least one system of record from a plurality of systems of record as a source of raw data for providing data to the one or more predefined data requirements,
       wherein the at least one system of record provides raw data to the one or more predefined data requirements through a tech fabric that causes the raw data to populate one or more enterprise object models to standardize the raw data.

12. The system of claim 11, wherein the at least one system of record is selected from the plurality of external systems of record comprising one or more of a manufacturing execution system, an enterprise resource planning system, an electronic batch record system, a laboratory information management system, and a quality management system.

13. The system of claim 11, wherein the at least one system of record is selectable based on the selected chapter such that each of multiple chapters in the APQR report do not require inclusion of data from same systems of record.

* * * * *